United States Patent [19]
Staley, Jr.
[11] Patent Number: 4,977,809
[45] Date of Patent: Dec. 18, 1990

[54] TROMBONES AND THE LIKE

[76] Inventor: Glenn L. Staley, Jr., 1508 E. Walnut, Carbondale, Ill. 62901

[21] Appl. No.: 444,964
[22] Filed: Dec. 4, 1989
[51] Int. Cl.[5] ............ G01D 7/10
[52] U.S. Cl. ............ 84/395
[58] Field of Search ............ 84/395, 387, 387 A, 84/453

[56] References Cited

U.S. PATENT DOCUMENTS 1,255,766 2/1918 Martens ............ 84/395
3,834,268 9/1974 McCracken ............ 84/395 X

*Primary Examiner*—Brian W. Brown
*Attorney, Agent, or Firm*—Haverstock, Garrett & Roberts

[57] ABSTRACT

A bracket assembly for mounting on a trombone to provide an alternative and more comfortable holding position for the instrument comprising a framework of connected tubular members including a pair of spaced side frame members and at least two spaced cross braces connected therebetween, an angularly oriented mounting portion connected to each of the side frame members, an attachment member on the free end of each mounting portion for engagement with angularly related tubular portions of the trombone, clamping means for attaching the attachment members to the trombone, and a transversely extending member attached to one of the side frame members for engagement by the hand that supports the instrument so located that said hand can optionally be positioned farther forward from the mouthpiece than if the instrument is supported by the same hand in the conventional manner. The bracket assembly can be permanently or detachably mounted and affords the player a more relaxed and less strained arm posture and better balance and leverage for holding the instrument.

11 Claims, 2 Drawing Sheets

TROMBONES AND THE LIKE

BACKGROUND OF THE INVENTION

Persons who play musical instruments and particularly trombones must support the instrument with one hand and use their other to control and move the slide member in order to change the tone of the output sounds which gives the instrument its distinctive characteristics. A trombone is a relatively heavy and awkward instrument in that it extends from behind the head to a position well forward of the head. Furthermore it is not the general practice to support the instrument on the shoulder and therefore the player of the instrument must support the instrument entirely with one hand while moving the slide with the other hand. The support means for conventional trombones are normally located at a position that is relatively close to the face of the player, which means that during playing the arm that supports the instrument must be relatively sharply bent at the elbow. The fact that the instrument is supported relatively close in means that the arm that supports the instrument has relatively little leverage on the instrument and as a result is usually experienced that the instrument supporting arm will tire relatively rapidly. These conditions limit the time that a trombone player can comfortably play his or her instrument. Also, the instrument is usually supported in large part by the fingers and the thumb, and this can cause the wrist as well as the forearm to assume a bent or strained position with respect to the upper arm, and the fingers and thumb as well as the arm therefore become uncomfortable. The fingers especially will be subject to increased fatigue.

The present invention includes a bracket mounted on a trombone in position to enable the player to better and more easily grip and hold the instrument and at a location farther from the face so that the arm that supports the instrument will have a wider angle at the elbow and an unbroken line from the forearm and wrist, both of which will improve the support of the instrument and provide better leverage for holding the instrument. A less sharply bent elbow is also generally a more therapeutic position for supporting the instrument for longer periods of time and with a less strained posture.

The improvements are embodied in additional support members or tubing which can be attached to the trombone at a location along one side of the instrument in position to be grasped in a substantially analogous way to a conventional trombone. With the subject improvements the player also has the option of using the usual conventional support means if desired. It is expected that most trombone players, especially those who play for long periods at a time, will probably prefer to hold the instrument with the new improved support feature since it will provide a more relaxed arm and better leverage and will enable the trombone player to play for longer times without becoming physically tired. The improved support means includes a bracketed frame for attaching to the trombone which frame has a transversely extending support member for engagement by the thumb of the supporting hand and an additional support member located forwardly of the thumb support where the fingers of the same hand can be used in instrument support in a relatively comfortable position. The bracketed frame assembly can be either permanently or removably attached as preferred and when used does not substantially change the appearance of the instrument.

It is a principal object of the present invention to provide improved means for supporting a musical instrument such as a trombone.

Another object is to make it possible for a trombonist to play his instrument for longer periods of time and in a more relaxed and therapeutic position without need to rest the player's elbow.

Another object is to provide relatively inexpensive means for attaching to a trombone to provide the player with an alternative place to grip and support the instrument and giving substantially the same "feel" as a conventional instrument.

Still another object is to provide an optionally detachable support means for installing on a trombone which improves both the transverse and longitudinal balance without substantially increasing the weight of the instrument and enables the operator to support it with less effort.

A further object is to provide support means that lessens the transverse and longitudinal imbalance that can result when a player inserts a mute or pivotally rests a muting device on the rim of the bell as well as when the slide is extended during playing.

A still further object is to provide a way to increase a trombonist's comfort by increasing the symmetry between the player's arm positions, i.e. decreasing the difference in the angles that the respective elbows are bent.

Still another object is to provide gripping means that can be installed on existing trombones or optionally, can be factory installed, to provide an alternative, less tiring and better way to support the instrument.

Another object is to increase the enjoyment of playing trombones and without substantially changing the overall weight and appearance of the instrument or the conventionally taught method of using the hand and fingers to support same.

These and other objects and advantages of the present invention will become apparent to those skilled in the art after considering the following detailed specification disclosing preferred embodiments of the invention in conjunction with the accompanying drawings.

DETAILED DESCRIPTION OF PREFERRED EMBODIMENTS

Figure 1:
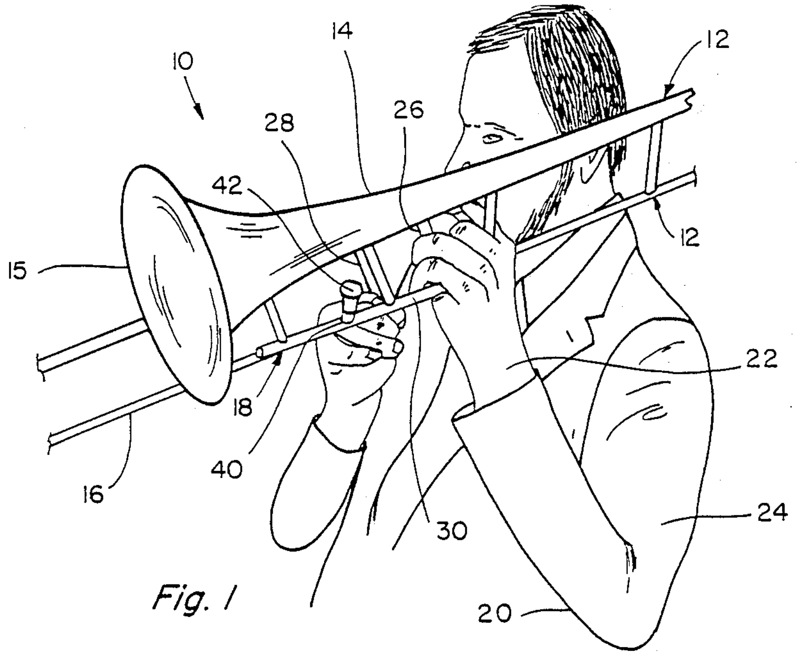
FIG. 1 is a perspective view showing a person supporting a trombone in a conventional manner during playing thereof.
Figure 2:
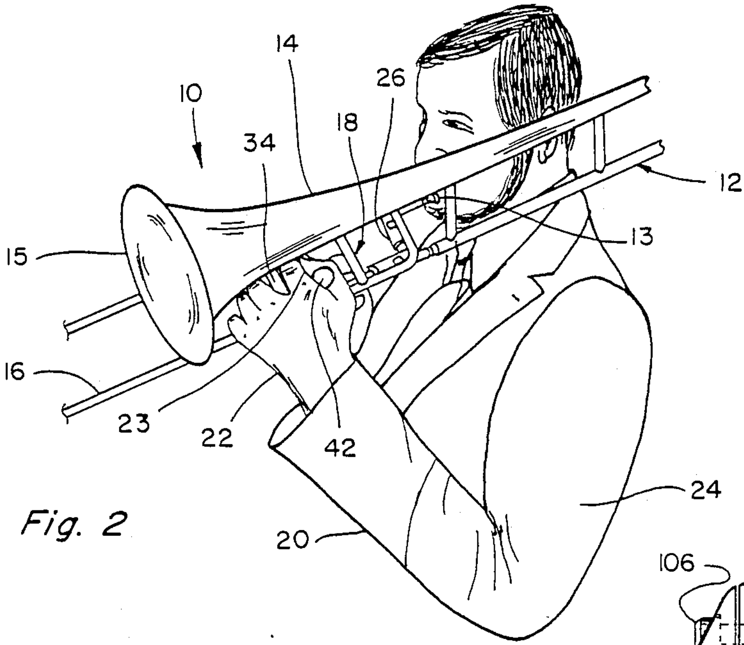
FIG. 2 is a view similar to FIG. 1 showing the trombone player supporting the instrument by the subject improved support means.

Referring to the drawings more particularly by reference numbers, number 10 in FIG. 1 refers to a trombone having the present improvements mounted thereon but shown being held in a conventional manner. The trombone 10 includes a so-called fixed portion 12 which includes the mouthpiece 13 and the horn portion 14 which includes the bell portion 15, and the tubing and braces that extend therebetween. The trombone 10 also includes a slide portion 16. The trombone 10 shown in FIGS. 1 and 2 is being played by a right handed person who is supporting the instrument with his left hand and arm and operating the slide portion 16 by grasping slide brace 28 with his right hand. In FIG. 1 the player is holding and supporting the instrument 10 with his left hand in a more or less conventional position, even though the instrument 10 is equipped with means whereby he can support the instrument in a better and more comfortable position using the subject bracket assembly or support means 18.

FIG. 2 shows the player supporting the instrument in a more arm relaxed position using the bracket means 18 attached to the trombone 10. Several embodiments of the bracket means 18 are shown and will be described in detail hereinafter.

Referring again to FIG. 1 it can be seen that the player's trombone supporting forearm 20 including his hand 22 are oriented at a relatively sharp angle with respect to the upper arm portion 24. In this position one part of the fixed portion 12 of the trombone extends behind the head of the player and the rest of the instrument extends in front of the player. The same is true of FIG. 2 except that in FIG. 2 the player's left forearm 20 and hand 22 which support the instrument are at a less sharply bent position with respect to the upper arm 24, and this is a more comfortable and relaxed position and one which provides better instrument support and control and one which the player can maintain for longer periods without encountering as much fatigue.

The trombone 10 including the stationary portion 12 and the slide portion 16, are played in the conventional manner and both portions of the instrument are of conventional construction and are not modified by the present invention. However, the stationary portion 12 of the trombone 10 is modified by attaching to it the bracket means 18 which provides an alternative means for the player to grip and support the instrument. The addition of the bracket means 18 does not prevent the player from gripping and supporting the instrument in the conventional manner as shown in FIG. 1 if he prefers, but it does provide an alternative way to grip and support the instrument. In FIG. 2 the player is shown supporting the instrument using the improved bracket support means 18 which enable the lower or supporting forearm and the hand to be located farther from the player's face. To compensate for the weight of the bracket assembly any factory installed counterweight at the rear of the fixed portion can be removed if desired to improve the instrument balance.

Figure 3:
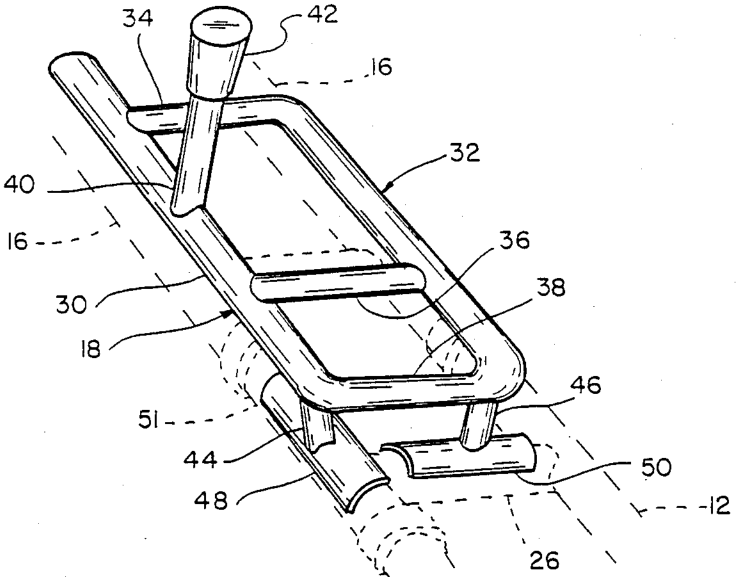
FIG. 3 is an enlarged perspective view of one embodiment of the subject improved support means shown in solid outline and in association with the portion of the trombone to which the support means are attached shown in dotted outline.

The improvements as taught by the present invention include removably attaching the bracket assembly 18 as shown in FIG. 3 to the basic instrument or alternatively, attaching such assembly as an integral part of the instrument during manufacture thereof. The bracket assembly 18 is formed of a plurality of connected members 30, 32, 34, 36, and 38 which may be made of any desired material or cross-section. If desired, the choice of materials can include those of tubular cross-section that match the material of the trombone itself so as not to detract from the overall appearance of the instrument. The bracket assembly 18 includes the two spaced parallel members 30 and 32 connected at their respective ends by the cross members 34 and 38. The bracket assembly also has the intermediate cross support member or brace 36 to add rigidity and to provide an additional means for grasping and supporting the instrument analogous to the brace 26 of the conventional trombone. The bracket assembly 18 also has a sidewardly extending tubular projection 40 fixedly connected to the tubular member 30 at an intermediate location. The sidewardly extending member 40 is shown having a cap 42 mounted on its free end which makes it easier to handle and when the assembly is detached serves to protect the instrument from dents if bumped by the detached assembly.

The bracket assembly 18 also includes sidewardly extending stud members 44 and 46 each of which is shown having a respective channel shaped member 48 and 50 attached to the free end thereof. The channel shaped member 48 and 50 are positioned to be in abutment with tubular frame members 51 and 26 on the fixed portion 12 of the trombone when mounted thereon. The channels can be welded or otherwise fixedly attached to the trombone or they can be attached by other means such as by clamping means. Alternatively, the channels can be replaced by clamping means such as is described hereinafter in connection with the embodiment of FIG. 5 and 7. If the channel shaped members 48 and 50 are removedly attached to the trombone, then the whole bracket assembly 18 can be removed to restore the trombone to its original conventional condition. If they are welded or otherwise attached to the trombone they cannot be removed, then the benefits provided by the bracket assembly 18 will be available regardless whether the player wants to use the conventional gripping means or the improved gripping means. It is also contemplated, if the bracket assembly 18 is to be removable, that the channel shaped members 48 and 50 will have cushioning material provided between them and the conventional portions of the trombone to which the device is to be attached so that the bracket 18 will not scratch or otherwise damage the instrument. The members 30, 34 and 40 are positioned relative to each other and dimensioned in such a way as to substantially duplicate the "feel" experienced by the player when holding the instrument in the conventional manner.

Figure 4:
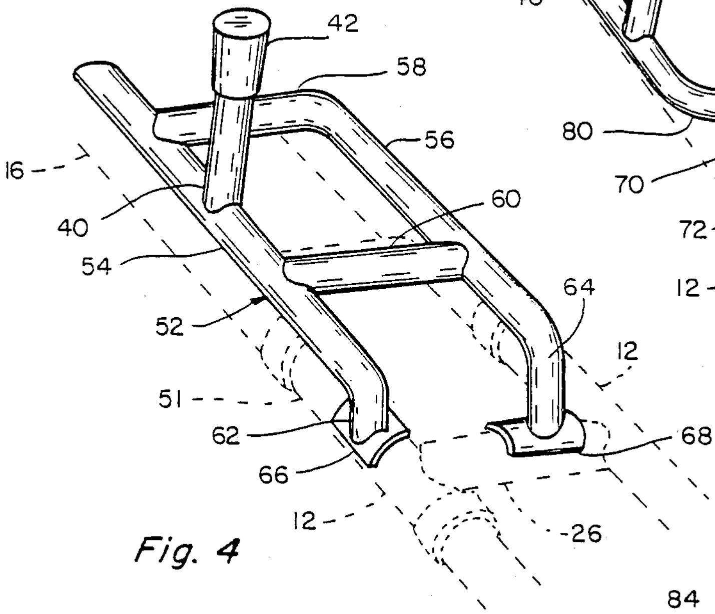
FIG. 4 shows another embodiment of the subject support means.

FIG. 4 shows a modified form of the subject bracket assembly 52 which includes members 54, 56, 58 and 60 that are similar to corresponding members of the bracket 18 but arranged in somewhat different manner. For example, the elongated side member 54 has an end portion 62 which is angularly formed or bent and this portion is attached to a channel shaped member 66 oriented in a direction to engage or to be attached to fixed tube member 51 on the trombone. The member 56 on the opposite side of the bracket assembly 52 likewise has a formed or bent end portion 64 with a channel shaped member 68 attached at a right angle to the free end thereof and oriented to engage brace member 26. The embodiment 52 may be attached to the trombone similarly as the bracket assembly 18 including being fixedly or removably attached to the trombone as desired.

Figure 5:
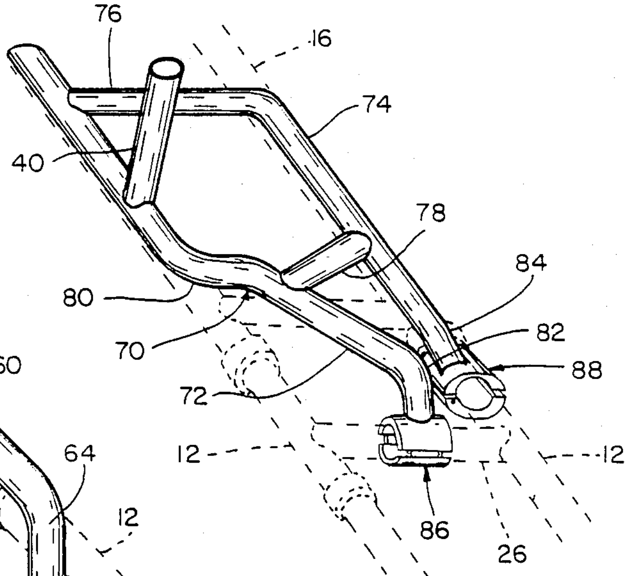
FIG. 5 shows yet another embodiment of the subject support means.

FIG. 5 shows another embodiment 70 of a bracket assembly which likewise includes two side members 72 and 74 one of which members 74 has an angularly related end portion 84 connected to one side of a two piece attachment or clamping assembly 88 provided for removably clamping the bracket assembly 70 to one of the tubular portions of a trombone. The modified bracket assembly 70 has its opposite side member 72 formed as shown and angularly related over much of its length to the aforesaid side member 74. One end portion 82 of the side member 72 is angularly formed for attaching to one part of another two part attachment or clamping assembly 86 provided for attaching it to the cross support member 26 on the trombone. The modified bracket assembly 70 likewise has a sidewardly extending member 40 which provides support for the thumb on the hand of the player that supports the trombone. In all embodiments of the present construction the bracket assemblies provide means for supporting the trombone at a location spaced forwardly or further out in front of the player than is conventional. The reasons for this are described above, namely to provide a better way to support a trombone and one which will result in less fatigue to the player and will not detract from the appearance of the instrument. It is expected that in many instances the player will be able to perform for longer periods of time and with less fatigue. At the same time the player has the option to support the instrument in a conventional way if desired.

Figure 7:
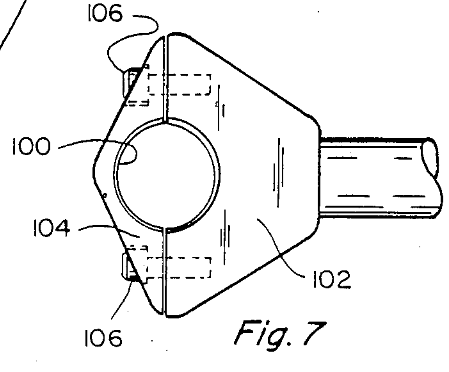
FIG. 7 is an enlarged elevation view of another clamp means which can be used in the construction of the embodiments shown in FIGS. 3, 4, or 5.
Figure 6:
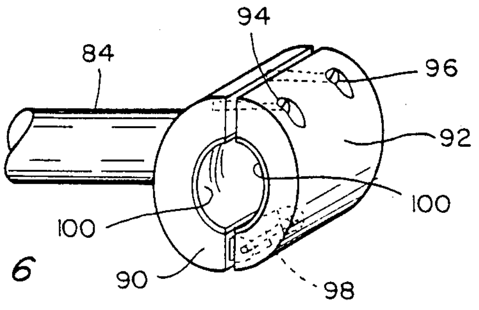
FIG. 6 is an enlarged perspective view of a clamp means used in the construction of FIG. 5.

FIGS. 6 and 7 show alternative forms of a clamping assembly such as clamping assemblies 86 and 88 for clamping the subject bracket assemblies 18, 52 and 70 to the respective tubular portions of a trombone. The clamps include two clamp members 90 and 92, which have provision for connecting screws and/or hinge means such as screws 94 or 96 and/or hinge means 98 or like fasteners which are drawn tight to complete the connection. Padding 100 is shown applied to the interior surfaces of the clamp members 90 and 92 to prevent damage or scratching to the surfaces of the instrument. A different shape for the clamp members 102 and 104 are shown in FIG. 7 and are held together by screws 106.

Referring again to FIG. 2 it can be seen that the thumb 23 on the left hand 22 of the person playing the trombone is positioned extending around one side of the sidewardly projecting member 40 on the bracket assembly 18. In this position the fingers of the same left hand are conveniently located so as to extend around the member 30 which is also part of the bracket assembly. If the player wants to support the instrument in a conventional manner all he has to do is move his hand backwardly or in a direction closer to the player's face to the usual support position.

In addition to the advantages discussed above several other advantages for the trombonist are realized when using the present support bracket, particularly for persons playing in a band or orchestra. The present bracket assembly for one thing enables the player to more rapidly elevate the instrument from a floor or lowered position as the centralized location of the player's hand with the present improved grip location provides better leverage and allows for more rapid rotation thereof. Such maneuvering is often required at the start of a musical part and at the conclusion of indicated rests. Likewise, the present assembly serves to improve the ability of the player to maneuver the instrument including especially at times when the slide is in a fully extended position and/or when a mute is installed. This will also help to compensate for slide friction. This is because less torque is applied to the player's wrist, and therefore it is easier for the player to rotate the instrument and raise its forward portion. The more forward location of the player's supporting hand also makes it easier to place the hand in the bell portion of the instrument as is sometimes required by the music.

Thus, there has been shown and described several embodiments of a novel and utilitarian support bracket for attaching to a trombone in order to provide the player a better alternative position for supporting and maneuvering the instrument during the playing thereof. It will be apparent to those skilled in the art, however, that many changes, modifications, variations, uses and applications for the subject device are possible, and all such changes, modifications, variations, uses and applications which do not depart from the spirit and scope of the invention are deemed to be covered by the invention which is limited only by the claims which follow.

What is claimed is:

1. A bracket assembly for mounting on a trombone to provide an alternative gripping position for the supporting hand of a player, comprising a framework of connected members including a pair of spaced side frame members and at least two spaced braces connected therebetween, an angularly oriented mounting portion connected to each of the side frame members, each mounting portion having a free end, an attachment member on the free end of each mounting portion, the attachment member on one mounting portion being angularly related to the attachment member on the other mounting portion and located so that the attachment members can be positioned in engagement with angularly related tubular portions on the trombone, means for attaching the attachment members to the trombone, and a transversely extending member attached to one of the side frame members in position so that when the hand that supports the instrument engages said bracket assembly and the thumb thereof engages the transversely extending member one or more fingers on the supporting hand will be in position to engage one of the two spaced braces.

2. The bracket assembly in accordance with claim 1 including a third spaced brace connected between said side frame members.

3. The bracket assembly in accordance with claim 1 wherein said means for attaching the attachment members include split clamp assemblies formed of first and second clamp members, and means connecting the first and second clamp members.

4. The bracket assembly in accordance with claim 1 wherein a portion of one of said spaced side members is bent so as to define a non-linear portion of the side member which portion lies substantially in the same plane as the other side member.

5. The bracket assembly in accordance with claim 1 wherein said attachment members are fixedly attached to the respective angularly related tubular portions on the trombone.

6. A hand engageable support structure for mounting on a trombone, said trombone having relatively moveable portions including a first portion including a mouthpiece at one end and a bell portion at the opposite end and a second slide portion, said support structure comprising a framework of connected elongated members including means thereon for mounting the framework on the trombone, the framework including a plurality of connected members including a transverse member for engagement by a supporting hand and thumb thereof and a second connected portion for engagement by at least one finger of the hand which supports the trombone, and means for attaching the framework to the trombone at a location such that the thumb and fingers of the hand that engages such support structure are located farther forward from the mouthpiece than is true when the instrument is supported by the same hand in the conventional manner.

7. The support structure of claim 6 wherein said means for attaching the framework to the trombone includes a pair of angularly oriented split clamp devices for engagement with respective tubular portions of the first trombone portion.

8. In a trombone having a first portion with a mouthpiece at one end, a bell portion at an opposite end, tubular members extending therebetween, and a slide portion slidably engageable with the tubular members of the first portion, the improvement including a bracket assembly to provide an alternative gripping position for the supporting hand of a player and means for attaching the bracket assembly to the tubular members of the first portion of the trombone, said bracket assembly including a plurality of connected elongated members including spaced members substantially parallel to the portions of the tubular members of the first portion of the trombone and other members substantially normal to the spaced members and to the first portion of the trombone including a transversely extending member for engagement by the supporting hand and thumb, and a connected member for engagement by fingers of the said hand, the means for attaching the bracket assembly to the first portion of the trombone including means for engaging angularly related tubular members of the first portion of the trombone and means for attaching said engaging means to the angularly related tubular members.

9. In the trombone of claim 8 wherein the means for attaching the bracket assembly to the first portion of the trombone includes at least one clamp assembly having opposed substantially semi-tubular portions and means connecting the semi-tubular portions to clamp said semi-tubular portions onto a tubular member of the first portion of the trombone.

10. In the trombone of claim 8 wherein the bracket assembly is mounted on the first portion of the trombone at a location such that the supporting hand of the player is spaced further forwardly from the mouthpiece than the position of the said supporting hand when the trombone is supported in a conventional manner.

11. A bracket assembly for mounting on a trombone to provide an alternative gripping position for the supporting hand of the player comprising a framework of connected tubular members including a pair of spaced side frame members at least a portion of each of which are parallel and at least two spaced cross braces connected therebetween, an angularly oriented end portion on each of the side frame members, each end portion having a free end, an attachment member on the free end of each end portion for engagement with the spaced angularly related tubular portions on the trombone, means for attaching the attachment members to the trombone, and a transversely extending member attached to one of the side frame members in position so that when the supporting hand and thumb engages the transversely extending member one or more fingers on the supporting hand will be in position to engage one of the two spaced side frame members.

* * * * *